US010938112B1

(12) United States Patent
Yue et al.

(10) Patent No.: US 10,938,112 B1
(45) Date of Patent: Mar. 2, 2021

(54) ANTENNA AND MOBILE TERMINAL

(71) Applicant: BEIJING XIAOMI MOBILE SOFTWARE CO., LTD., Beijing (CN)

(72) Inventors: Yongbo Yue, Beijing (CN); Zonglin Xue, Beijing (CN); Jie Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/743,201

(22) Filed: Jan. 15, 2020

(30) Foreign Application Priority Data

Sep. 24, 2019 (CN) ........................ 201910904947.8

(51) Int. Cl.
*H04M 1/00* (2006.01)
*H01Q 13/10* (2006.01)
*H01Q 1/24* (2006.01)
*H01Q 1/48* (2006.01)

(52) U.S. Cl.
CPC ............ *H01Q 13/10* (2013.01); *H01Q 1/243* (2013.01); *H01Q 1/48* (2013.01)

(58) Field of Classification Search
CPC ........ H01Q 1/38; H01Q 1/243; H01Q 13/085; H01Q 13/10; H01Q 13/18; H01Q 13/24; H01Q 13/25007; H04M 1/02; H04M 1/026; H04M 1/03; H04B 1/04; H04B 1/16; H04B 1/3827; H04B 2203/5441
See application file for complete search history.

(56) References Cited

U.S. PATENT DOCUMENTS 9,035,840 B1 * 5/2015 Lee ........................ H01Q 1/243 343/770
9,516,150 B2 * 12/2016 Jeon .................... H04M 1/0202
9,735,461 B2 * 8/2017 Lo Hine Tong ....... H01Q 13/10
9,871,286 B2 * 1/2018 Kang ..................... H01Q 1/243
9,966,655 B2 * 5/2018 Li .......................... H01Q 1/243
2014/0078008 A1 3/2014 Kang et al.
2014/0145886 A1 5/2014 Cui
2014/0347225 A1 * 11/2014 Harper .................. H01Q 1/242 343/702
2017/0005414 A1 * 1/2017 Yang ...................... H01Q 13/10
2017/0250460 A1 8/2017 Shin et al.

OTHER PUBLICATIONS

Extended European Search Report in Application No. 20157209, dated Aug. 19, 2020.

* cited by examiner

*Primary Examiner* — Quochien B Vuong
(74) *Attorney, Agent, or Firm* — Syncoda LLC; Feng Ma

(57) ABSTRACT

An antenna includes a feed; a first member being made of metallic materials and including an end plate and side wall plates disposed on both sides of the end plate, in which the feed is disposed on the end plate of the first member, and slots are respectively formed on the side wall plates of the first member; and second members made of non-metallic materials and bonded to the first member to shield the slots. The antenna and a mobile terminal including the antenna can achieve an aesthetically pleasing appearance and improve user experience, as the slots cannot be observed when viewed from outside the mobile terminal.

16 Claims, 3 Drawing Sheets

ANTENNA AND MOBILE TERMINAL

CROSS-REFERENCE TO RELATED APPLICATION

This application claims priority to Chinese Patent Application No. 201910904947.8 filed on Sep. 24, 2019, the disclosure of which is hereby incorporated by reference in its entirety.

BACKGROUND

Along with every increasing requirements of users on mobile communication devices and vigorous development of communication technologies, technical requirements for mobile communication devices have also become more sophisticated. Especially in terms of mobile communication technologies, conventional 2 G technologies have been developed to the current 5 G technologies. With the development of 5 G technologies, the requirements for antennas have increased.

SUMMARY

According to one aspect of embodiments of the present disclosure, there is provided an antenna, comprising: a feed; a first member being made of metallic materials and including an end plate and side wall plates disposed on both sides of the end plate, wherein the feed is disposed on the end plate of the first member, and slots are formed on at least one of the side wall plates of the first member; and second members made of non-metallic materials and bonded to the first member to shield the slots.

According to another aspect of embodiments of the present disclosure, there is provided a mobile terminal, comprising: an antenna, which is the antenna according to the first aspect and any foregoing embodiment; and a housing including an upper housing and a lower housing, wherein the lower housing includes a bottom plate; the upper housing includes a panel provided with a metal area; and the first member of the antenna is connected with the bottom plate.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the invention and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In a mobile communication device such as a mobile phone, a slot antenna can be provided. In order to arrange the slot antenna, slots need to be formed at the bottom of the mobile communication device, so that the antenna can achieve radiation performance. However, because the slots are formed at the bottom of the mobile communication device, the slot different from the metal area is formed at the bottom of the mobile communication device, such the metal area is discontinuous. The appearance of the mobile communication device can also be affected. At the same time, in order to prevent the metal structure from shielding the electromagnetic waves of the antenna and to ensure the signal receiving sensitivity of the antenna, the appearance of the mobile communication device may have to be sacrificed to ensure the performance of the antenna.

An antenna provided by various embodiments of the present disclosure can be applied to various mobile communication devices such as mobile phones, radios, and tablet computers. In the description of the following embodiments, description is given only by taking the mobile phone as an example, but the present disclosure is not limited thereto.

Various embodiments of the present disclosure can address that the signal receiving sensitivity of the antenna is ensured without sacrificing the appearance of the mobile phone, but also the freedom in the appearance design of the mobile phone is improved, with good signal transmission.

Figure 1:
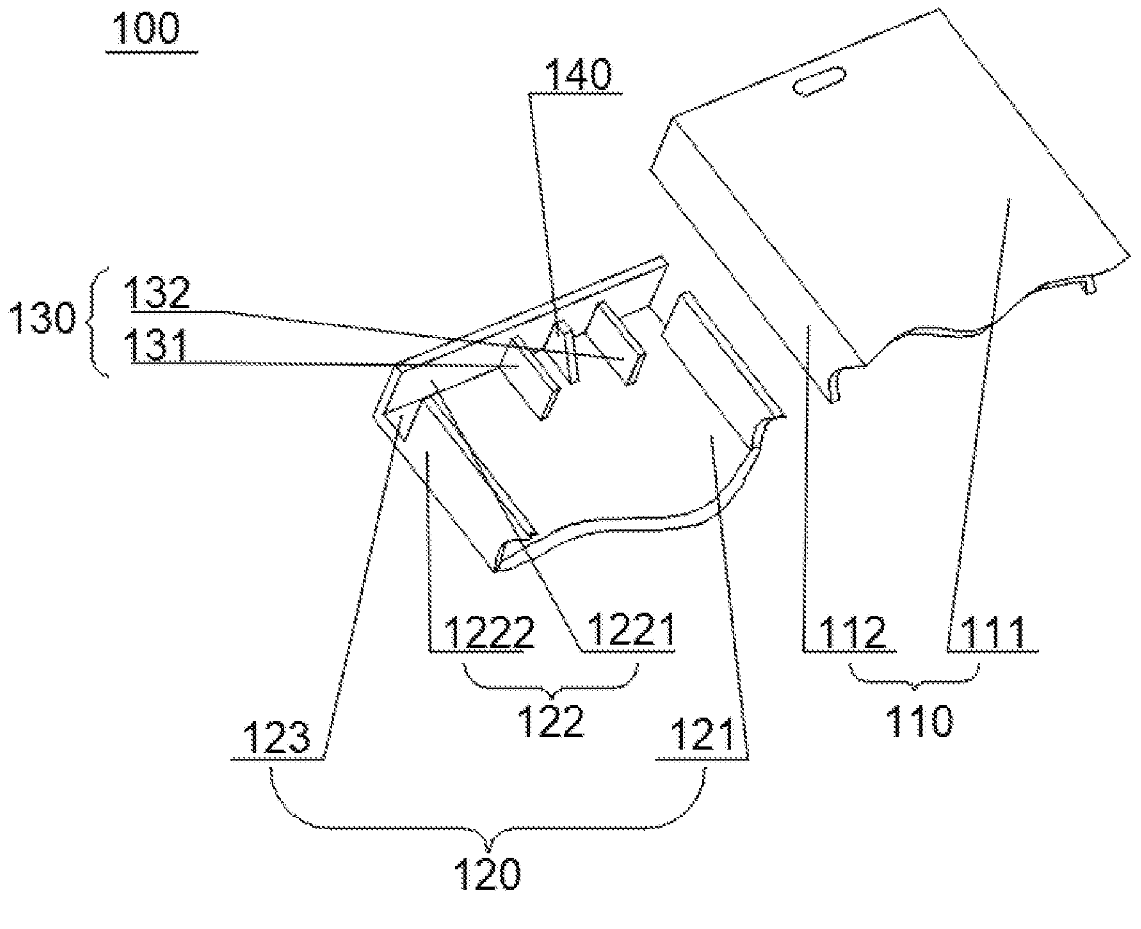
FIG. 1 is an exploded view for illustrating an antenna according to some embodiments of the present disclosure.
Figure 2:
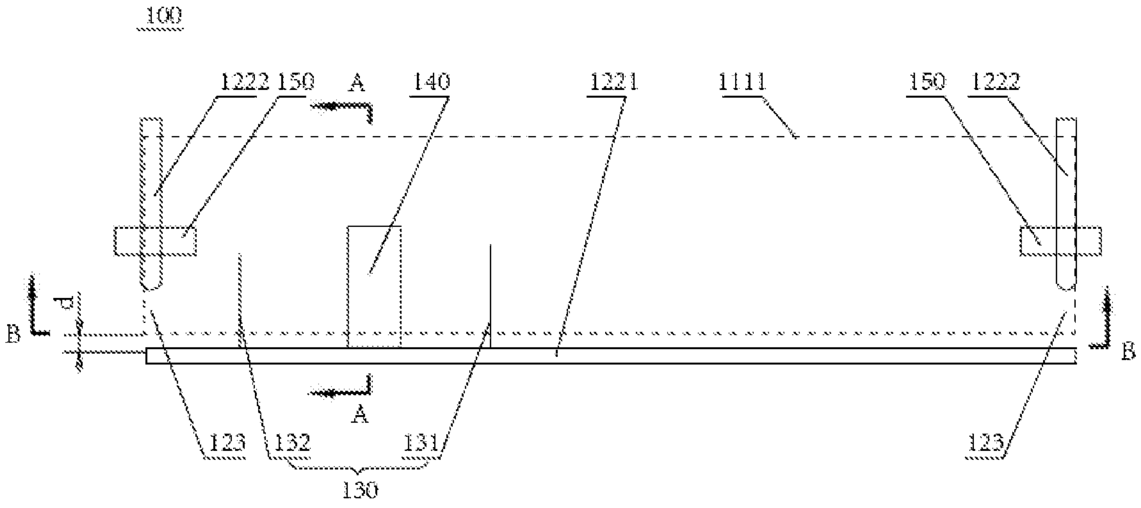
FIG. 2 is a top view for illustrating the antenna according to some embodiments of the present disclosure.

FIG. 1 is an exploded view for illustrating an antenna according to some embodiments of the present disclosure. FIG. 2 is a top view for illustrating the antenna according to some embodiments of the present disclosure.

Referring to FIGS. 1 and 2, there is provided an antenna 100 according to some embodiments of the present disclosure, comprising a feed 130, a first member 122 and a second member 112.

In some embodiments of the present disclosure, the feed 130 may include a first feed element 131 and a second feed element 132.

The first member 122 is made of metal materials and may be a radiator of the antenna 100. In some embodiments of the present disclosure, the first member 122 may include an end plate 1221 and side wall plates 1222 respectively perpendicular to both ends of the end plate 1221. The first feed element 131 and the second feed element 132 of the feed 130 are respectively disposed on the end plate 1221 of the first member 122. The first feed element 131 and the second feed element 132 of the feed 130 are disposed between two side wall plates 1222.

In some embodiments of the present disclosure, a slot 123 is formed on at least one side wall plate of the first member. In one embodiment, one slot 123 may be respectively formed on each of the two side wall plates 1222. That is to say, the slot 123 is respectively formed on both sides of the feed 130. As long as the slot 123 is formed on both sides of the feed 130, the position of the slot 123 on the side wall plate 1222 is not limited. For example, referring to FIGS. 1 and 2, the slot 123 may be formed at a position of the side wall plate 1222 close to the end plate 1221, namely the slot 123 may be formed at an end portion of the side wall plate 1222 connected with the end plate 1221.

In some embodiments of the present disclosure, the second member 112 is made of non-metallic materials. The shape of the second member 112 may be adapted to the shape of the first member 122, so as to be bonded to the first member 122. When the second members 112 are bonded to the first member 122, the second members 112 may shield the two slots 123.

As long as the second member 112 can shield the slot 123, the structure of the second member is not specifically limited. For example, in some embodiments of the present disclosure, the second members 112 may be disposed on two sides of a housing 110 (described later) of a mobile phone, or may be integrally formed with the housing 110 of the mobile phone. When the housing 110 of the mobile phone is mounted on the mobile phone, the second members 112 disposed on both sides of the housing 110 may shield the slots 123.

The above structure forms the antenna 110 according to one embodiment of the present disclosure. The feed 130 of the antenna 100 is connected with the first member 122 made of the metallic materials to realize the functions of the antenna 100. Two slots 123 are formed at two ends of the feed 130 of the first member 122, and the feed 130 is configured to radiate electromagnetic waves to the outside through the two slots 123.

In the embodiment, the antenna 100 is provided with the second members 112 which are bonded to the first member 122 at least at the slots 123 to shield the slots 123 from the outside, so as to change the appearance of the mobile phone equipped with the slot antenna 100. The second member 112 is made of non-metallic materials, without shielding the electromagnetic waves of the feed 130 and without affecting the antenna function of the feed 130. The second member may be made of polyimide (PI), glass or other non-metallic materials.

In the antenna 100 according to the embodiment of the present disclosure, when the mobile phone equipped with the antenna 100 is viewed from the outside, two slots existing in the conventional arts cannot be seen, and there is no poor appearance caused by any discontinuity in the metal housing due to two different materials. That is to say, in the antenna 100 according to the embodiment of the present disclosure, the slots 123 cannot be observed when observed from the outside, so as to achieve a very beautiful appearance, satisfy user requirements, and improve user experience. In the conventional art, the appearance of the mobile phone has to be sacrificed to ensure the sensitivity of the signal reception of the antenna. However, the antenna 100 according to the embodiment of the present disclosure not only ensures the signal receiving sensitivity of the antenna 100 without sacrificing the appearance of the mobile phone but also improves the freedom in the appearance design of the mobile phone, and meanwhile, also realizes good signal transmission.

In some embodiments of the present disclosure, a spacer 140 may also be disposed between the first feed element 131 and the second feed element 132 of the feed 130.

As described above, the feed 130 includes the first feed element 131 and the second feed element 132. The two feed elements are arranged to receive communication signals in different frequency bands to realize multi-band signal transmitting and receiving function. In the embodiment, the first feed element 131 is configured to receive low frequency and sub-6-GHz signals, and the second feed element 132 is configured to receive 2 G, 3 G and 4 G medium and high frequency signals. The arrangement of the spacer 140 between the first feed element 131 and the second feed element 132 avoids the mutual signal interference between the first feed element 131 and the second feed element 132 and then ensures that the antenna 100 can receive the communication signals.

In general, other electronic components, such as USBs, loudspeakers, cameras, and the like, are also disposed near the feed 130. The arrangement of more than two feed elements may realize multi-band signal antenna. In the case of only arranging one feed element, there are problems such as incompatibility with sub-6-GHz signals. In the case of arranging a plurality of feed elements, the spacer must also be disposed between the feed elements to avoid the signal interference between two feed elements. However, as described above, other electronic components are also disposed near the feed 130, and the design space of the feed 130 is very limited. In the embodiment, the two slots 123 are respectively formed on the side wall plates 1222 on both sides to release a conventional space in which the slots 123 are formed on the end plate 1221, namely increasing a space in which other electronic components are mounted on the end plate 1221. In the case of arranging two feed elements on the end plate 1221, multi-band feed function can be realized.

In one embodiment, referring to FIG. 2, a first grounding point 150 is formed on the two side wall plates 1222 respectively.

In one embodiment, referring to FIG. 2, the slot 123 is formed between the first grounding point 150 and a connecting end of the side wall plate 1222 with the end plate 1221.

Figure 3:
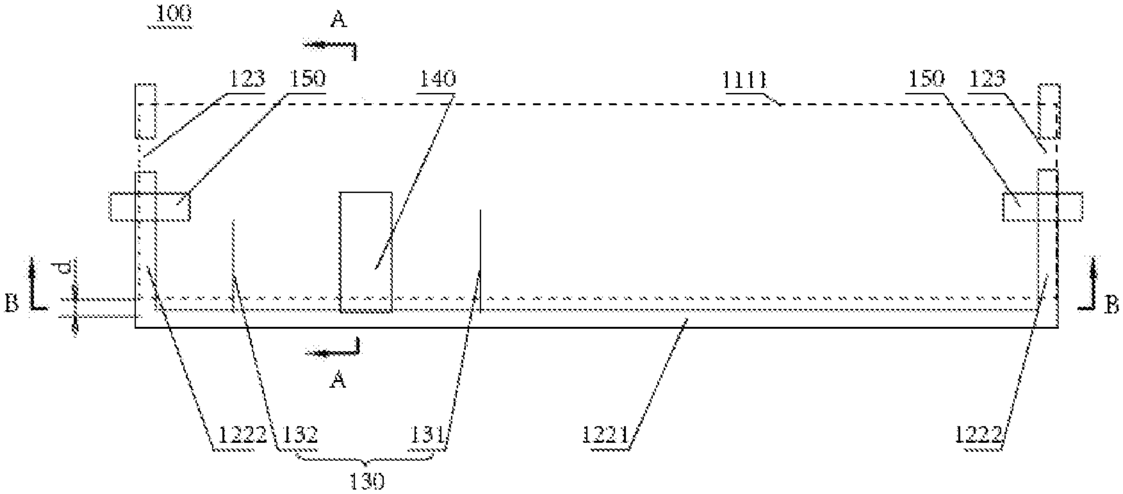
FIG. 3 is a top view for illustrating an antenna according to another exemplary embodiment of the present disclosure.

FIG. 3 is a top view for illustrating an antenna 100 according to another exemplary embodiment of the present disclosure.

Referring to FIG. 3, in the embodiment, the slot 123 is arranged away from the first grounding point 150 relative to the connecting end of the side wall plate 1222 and the end plate 1221. That is, at another end of the side wall plate 1222 relative to the connecting end of the side wall plate 1222 and the end plate 1221, the slot 123 is formed between another end of the side wall plate 1222 and the first grounding point 150.

As described above, as long as the slots 123 are formed on both sides of the feed 130, the position of the slot 123 on the side wall plate 1222 is not limited. That is to say, the position of the slot 123 on the side wall plate 1222 may be determined according to actual conditions. The slot 123 may be formed between the first grounding point 150 and the end plate 1221 and is close to the feed 130, thereby facilitating the electromagnetic radiation of the feed 130. As long as the electromagnetic radiation of the feed 130 is not affected, the slots 123 may also be formed at positions away from the end plate 1221.

According to another aspect of embodiments of the present disclosure, there is provided a mobile terminal, comprising: an antenna 100 and a housing. The antenna 100 is the antenna 100 according to the first aspect and any foregoing embodiment. Referring to FIG. 1, the housing includes an upper housing 110 and a lower housing 120. The lower housing 120 includes a bottom plate 121 and a first member 122 connected with the bottom plate 121. The upper housing 110 includes a panel 111. The second member 112 may be the panel 111 or may also be integrally formed by bending an edge portion of the panel. In order to increase the screen-to-body ratio, a display panel of the mobile terminal may be set to be a cylinder that is bent by the panel with opening at two ends. The panel 111 includes a metal area 1111.

In the mobile terminal with the above structure, the upper housing 110 is covered and fastened to the lower housing 120, and the second member 112 of the upper housing 110 is bent by the panel 111 to form an integral structure. The first member 122 of the lower housing 120 may also be bent by the bottom plate 121.

Currently, users have high requirement on the appearance of the mobile phone and like metal appearance. Meanwhile, the antenna 100 needs to be connected with a first frame (i.e. the first member) 122 made of metal. Accordingly, the lower housing 120 provided with the bottom plate 121 and the first frame 122 is formed by bending the bottom plate 121, which facilitates the manufacturing process. In addition, in pursuit of a lightweight housing, the bottom plate 121 may be made of non-metallic materials, and the first frame 122 made of metallic materials may be connected with the bottom plate 121 by riveting, welding, and the like.

The mobile terminal, such as the mobile phone, generally adopts a slot antenna. As the two slots formed on a bottom frame of the mobile phone are blocked by components made of non-metallic materials, such as plastics, the appearance is improved to some extent, but the slots can still be clearly seen due to color and other reasons. However, in the mobile terminal in the embodiment, a second frame (the second member) 112 is fastened from the outside of the first frame 122 to realize shielding the lower housing 120 by the upper housing 110 and shielding the two slots 123 formed on the first frame 122, so that the slots 123 cannot be observed from the outside. Therefore, the appearance of the mobile phone provided with the slots 123 is improved.

In the antenna 100 and the mobile terminal according to the embodiment of the present disclosure, the slots 123 cannot be observed when viewed from the outside, so as to realize a very beautiful appearance, increase the design space of the appearance of the mobile phone, satisfy the appearance requirement of users, and improve user experience.

In one embodiment, the spacer 140 is a ribbed plate connected between the end plate 1221 and the bottom plate 121.

In the process of manufacturing the housing, especially a housing in which the bottom plate 121 and the first frame 122 are separable structure, the ribbed plate is usually disposed between the first frame 122 and the bottom plate 121 in order to increase the strength of the housing. As the ribbed plate is taken as the spacer 140 between the two feed elements, the internal space of the housing 120 is effectively saved. Other components are not required to be additionally arranged, so the production cost is reduced.

In one embodiment, the spacer 140 taken as the ribbed plate may be made of non-metallic materials.

The ribbed plate made of non-metallic materials as the spacer 140 can effectively avoid the signal interference between the two feed elements and realize the function of the multi-band signal antenna. The spacer 140 with the above structure realizes the isolation from −6 dB to −7 dB.

Figure 4:
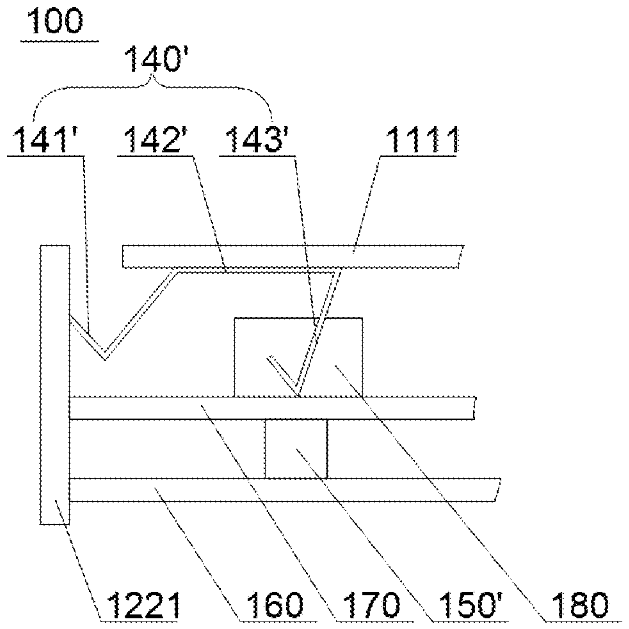
FIG. 4 is a cross-sectional view of the antenna along line A-A in FIG. 2 according to some embodiments of the present disclosure.
Figure 5:
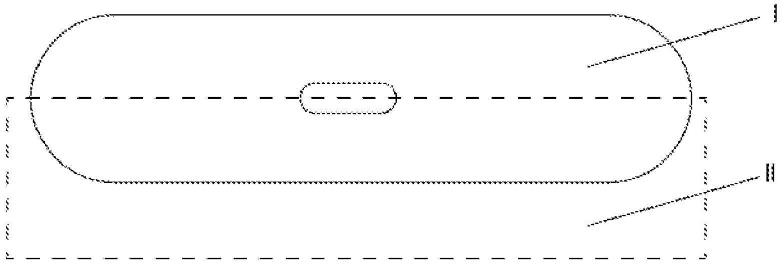
FIG. 5 is cross-sectional view of the antenna along line B-B in FIG. 2 according to some embodiments of the present disclosure.

FIG. 4 is a cross-sectional view of the antenna along line A-A in FIG. 2 according to some embodiments of the present disclosure. FIG. 5 is a cross-sectional view of the antenna along line B-B in FIG. 2 according to some embodiments of the present disclosure.

In one embodiment, referring to FIGS. 4 and 5, the mobile phone further includes a circuit board 170 grounded through a second grounding point 150' and a card holder 180 which is disposed between the circuit board 170 and the panel 111 and close to the circuit board 170.

In the mobile terminal, for example, the mobile phone must be provided with the card holder 180 for fixing a communication card. The card holder 180 is arranged on the circuit board 170 so that a magnetic card of the communication card can contact the circuit of the circuit board 170 to realize communication function. The circuit board 170 is grounded through the second grounding point 150' to realize the grounding of the circuit of the circuit board and the communication card.

In one embodiment, the distance between the metal area 1111 and the end plate 1221 is less than or equal to 1 mm or less than or equal to 0.8 mm.

The spacing distance d (shown in FIG. 2) between the metal area 1111 on the panel 111 and the end plate 1221 may be less than or equal to 1 mm, so a narrow space is formed to be a clear space of the antenna 100. In the embodiment, distance d may be less than or equal to 0.8 mm.

Referring to FIG. 5, the solid portion in the B-B cross-section is a metal part I, the dotted portion is a non-metal part II; and an overlap part of the metal part I and the non-metal part II occupies about 50% of the metal part I, so the area of the non-metal part is reduced. The distance d shown in FIG. 4 and a space of the non-metal part II shown in FIG. 5 not occupied by the metal part I, form a stereo clear area of the antenna. This part of stereo clear area is very small and contributes for the improvement of the screen-to-body ratio of the mobile terminal such as the mobile phone.

In one embodiment, a spacer 140' includes a first elastic plate 141', a second elastic plate 142' and a third elastic plate 143' which are sequentially connected. Preset angles are formed among the first elastic plate 141', the second elastic plate 142' and the third elastic plate 143'. For example, the angle between the first elastic plate and the second elastic plate is an obtuse angle; and the angle between the second elastic plate and the third elastic plate is an acute angle. The first elastic plate 141' is connected with the end plate 1221, the second elastic plate 142' is connected with the metal area 1111 of the panel 111, and the third elastic plate 143' is connected with the card holder 180. The first elastic plate 141', the second elastic plate 142' and the third elastic plate 143' form a three-direction elastic plate. As long as the three-direction elastic plate can be formed, the preset angle between every two elastic plates is not limited and may be designed according to the design space of the mobile phone.

For example, in one embodiment, the first elastic plate 141' may be formed by a first-direction elastic plate extended along a first direction and a second-direction elastic plate extended along a second direction different from the first direction. An intersecting angle of the first direction and the second direction is not limited. For example, the intersecting angle of the first direction and the second direction may be from 10 degrees to 160 degrees, from 30 degrees to 120 degrees, or from 45 degrees to 100 degrees. The setting of the intersecting angle of the first direction and the second direction as described above can more effectively realize the grounding return of the feed 130 connected with the end plate 1221 as soon as possible.

For example, in one embodiment, the second-direction elastic plate of the first elastic plate 141' is connected with the second elastic plate 142'. The second elastic plate 142' is extended along a third direction different from the second direction. The angle formed by the second-direction elastic plate of the first elastic plate 141' and the second elastic plate 142' is not limited and may be designed according to the design space of the mobile phone. The angle formed by the second-direction elastic plate of the first elastic plate 141' and the second elastic plate 142' may be from 10 degrees to 160 degrees, from 30 degrees to 120 degrees, or from 45 degrees to 100 degrees.

For example, in one embodiment, the third elastic plate 143' is formed by a fourth-direction elastic plate extended along a fourth direction and a fifth-direction elastic plate extended along a fifth direction different from the fourth direction. The intersecting angle of the fourth direction and the fifth direction is not limited. The angle formed by the fourth direction and the fifth direction may be from 10 degrees to 160 degrees, from 30 degrees to 120 degrees, or from 45 degrees to 100 degrees.

For example, in one embodiment, the second elastic plate 142' may be connected with the fourth-direction elastic plate of the third elastic plate 143'. The angle formed by the second elastic plate 142' and the fourth-direction elastic plate of the third elastic plate 143' is not limited and may be designed according to the design space of the mobile phone. The angle formed by the fourth-direction elastic plate of the third elastic plate 143' and the second elastic plate 142' may be from 10 degrees to 160 degrees, from 30 degrees to 120 degrees, or from 45 degrees to 100 degrees.

In some embodiments of the present disclosure, the structure of the three-direction elastic plate type spacer 140' is not limited to that defined in the embodiment. The three-direction elastic plate type spacer 140' in the present disclosure indicates that it is provided with at least three directions elastic plates which can be respectively connected with the end plate 1221, the metal area 1111 and the card holder 180. Thus, the structure of the three-direction elastic plate type spacer 140' is not limited to elastic plates with only three directions. As described above, the three-direction elastic plate type spacer 140' may include five elastic plates in different directions, namely may include elastic plates in more than three different directions.

For example, in another embodiment, the first elastic plate 141' is connected with the end plate 1221, the second elastic plate 142' is connected with the card holder 180, and the third elastic plate 143' is connected with the metal area 1111 of the panel 111.

The three-direction elastic plate type spacer 140' is not specifically limited as long as it can be connected to the end plate 1221, the card holder 180 and the metal area 1111 of the panel 111.

In the embodiment, the spacer 140' adopts three-direction elastic plate structure. As the first elastic plate 141' is connected with the end plate 1221, the second elastic plate 142' is connected with the metal area 1111 of the panel 111 and the third elastic plate 143' is connected with the card holder 180, the feed 130 connected with the end plate 1221 realizes grounding return as soon as possible. The three-direction elastic plate type spacer 140' improves the isolation effect between the first feed element 131 and the second feed element 132 of the feed 130. The isolation of the first feed element 131 and the second feed element 132 can reach more than −10 dB while ensuring good contact between the first and second feed element 131 and 132 and the end plate 1221.

In one embodiment, the metal area 1111 is electrically connected with a first grounding point 150 through conductive silicone adhesive or conductive foam. The circuit board 170 is electrically connected with a second grounding point 150' through a grounding elastic sheet.

As an embodiment of the mobile terminal, taking a mobile phone as an example, the mobile phone is a full screen phone with very high screen-to-body ratio. A display screen of the mobile phone may include a panel 111 of an upper housing 110. An edge portion of the display screen is bent to form a second frame (i.e. the second member)112, and at least the second frame 112 is made of non-metallic materials.

A lower housing 120 of the mobile phone is composed of a bottom plate 121 and a first frame (i.e. the first member) 122, and at least the first frame 122 is made of metallic materials. The end plate 1221 of the first frame 122 is a bottom frame provided with a microphone, and a first feed element 131 and a second feed element 132 are connected to an inner side surface of the bottom frame. The first feed element 131 is configured to receive low frequency and sub-6-GHz signals, and the second feed element 132 is configured to receive medium and high frequency signals of 2 G, 3 G, 4 G and the like. A spacer 140' is disposed between the first feed element 131 and the second feed element 132.

A metal area 1111 is disposed on the display screen of the mobile phone. In the embodiment, the metal area 1111 may be a metal plate below the display screen. A circuit board 170 is disposed below the metal plate, and a card holder 180 for inserting a communication card (SIM card) therein is disposed on the circuit board 170.

A bottom plate 121 of the housing of the mobile phone is disposed below the circuit board 170. If the bottom plate 121 is made of metallic materials, the circuit board 170 may be connected with the bottom plate 121, so as to realize the circuit grounding return of the circuit board 170 and the card holder 180. If the bottom plate 121 is made of non-metallic materials, a metal plate disposed in the housing, for example, a metal plate 160 for supporting various electronic components, may be taken as a grounding point to realize the circuit grounding return of the circuit board 170 and the card holder 180.

The distance between the metal area 1111 and the bottom frame may be less than or equal to 0.8 mm, so as to effectively improve the screen-to-body ratio. In some embodiments of the present disclosure, the adoption of the three-direction elastic plate type spacer 140', namely the first elastic plate 141', the second elastic plate 142' and the third elastic plate 143' which are sequentially connected, not only realizes high screen-to-body ratio but also ensures the signal receiving sensitivity of the antenna 100.

In such embodiment, the first elastic plate 141' is connected with the end plate 1221, the second elastic plate 142' is connected with the metal area 1111, and the third elastic plate 143' is connected with the card holder 180, so as to realize the grounding return of the feed 130 connected with the end plate 1221 as soon as possible. The three-direction elastic plate type spacer 140' improves the isolation effect of the first feed element 131 and the second feed element 132 of the feed 130. The isolation of the first feed element 131 and the second feed element 132 can reach more than −10 dB in the case of ensuring good contact between the first and second feed element 131 and 132 and the end plate 1221.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of some embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the disclosure being indicated by the following claims.

The invention claimed is:

1. A mobile terminal comprising:
an antenna, comprising:
a feed;
a first member composed of metallic materials and including an end plate and side wall plates disposed on both sides of the end plate, wherein the feed is disposed on the end plate of the first member, and a slot is formed on at least one of the side wall plates of the first member, and
second members composed of non-metallic materials and bonded to the first member to shield the slot;
a housing including an upper housing and a lower housing; wherein the lower housing includes a bottom plate; the upper housing includes a panel provided with a metal area; and the first member of the antenna is connected with the bottom plate; wherein the feed includes a first feed element and a second feed element which are disposed on the end plate of the first member; wherein a spacer is disposed between the first feed element and the second feed element; and wherein the spacer of the antenna is a ribbed plate connected between the end plate of the antenna and the bottom plate.

2. The mobile terminal of claim 1, wherein the feed includes a first feed element and a second feed element which are disposed on the end plate of the first member.

3. The mobile terminal of claim 2, wherein a spacer is disposed between the first feed element and the second feed element.

4. The mobile terminal of claim 1, wherein a first grounding point is disposed on the two side wall plates respectively.

5. The mobile terminal of claim 4, wherein the slot is disposed between the first grounding point and a connecting end of the side wall plate with the end plate.

6. The mobile terminal of claim 4, wherein the slot is arranged away from the first grounding point relative to a connecting end of the side wall plate with the end plate.

7. The mobile terminal of claim 1, wherein the distance between the metal area of the panel and the end plate of the antenna is less than or equal to 1 mm.

8. The mobile terminal of claim 1, wherein the distance between the metal area of the panel and the end plate of the antenna is less than or equal to 0.8 mm.

9. The mobile terminal of claim 1, wherein the mobile terminal further includes a circuit board which is grounded through a second grounding point; and a card holder is disposed between the circuit board and the panel and arranged close to the circuit board.

10. The mobile terminal according to claim 1, wherein a first grounding point is disposed on the two side wall plates respectively; the slot is disposed between the first grounding point and a connecting end of the side wall plate with the end plate; or, the slot is arranged away from the first grounding point relative to connecting end of the side wall plate and the end plate.

11. The mobile terminal according to claim 10, wherein the metal area is electrically connected with the first grounding point of the antenna through conductive silicone adhesive or conductive foam; a circuit board of the mobile terminal is electrically connected with a second grounding point through a grounding elastic sheet; and the slot is not visible from outside the terminal.

12. A mobile terminal comprising:
and antenna, comprising;
a feed;
a first member composed of metallic materials and including an end plate and side wall plates disposed on both sides of the end plate, wherein the feed is disposed on the end plate of the first member, and a slot is formed on at least one of the side wall plates of the first member; and
second members composed of non-metallic materials and bonded to the first member to shield the slot;
a housing including an upper housing and a lower housing; wherein the lower housing includes a bottom plate; the upper housing includes a panel provided with a metal area; and the first member of the antenna is connected with the bottom plate; wherein the feed includes a first feed element and a second feed element which are disposed on the end plate of the first member; wherein a spacer is disposed between the first feed element and the second feed element; wherein the spacer of the antenna is a three-direction elastic type spacer; and the three-direction elastic plate type spacer is connected to the end plate of the antenna, a card holder of the mobile terminal, and the metal area of the panel of the antenna respectively.

13. The mobile terminal of claim 12, wherein the three-direction elastic plate type spacer includes a first elastic plate extended along a first direction, a second elastic plate extended along a second direction different from the first direction, and a third elastic plate extended along a third direction different from the second direction; and the first elastic plate, the second plastic plate and the third elastic plate are respectively connected to one of the end plate of the antenna, the card holder of the mobile terminal, and the metal area of the panel of the antenna.

14. The mobile terminal of claim 13, wherein the angle of between the first elastic plate and the second elastic plate is an obtuse angle; and the angle between the second elastic plate and the third elastic plate is an acute angle.

15. The mobile terminal of claim 12, wherein the three-direction elastic plate type spacer includes a first elastic plate extended along a first direction, a second elastic plate extended along a second direction different from the first direction, and a third elastic plate extended along a third direction different from the second direction; and an angle formed by the first elastic plate and the second elastic plate is different from an angle formed by the second elastic plate and the third elastic plate.

16. A mobile terminal comprising:

an antenna, comprising:

a feed;

a first member composed of metallic materials and including an end plate and side wall plates disposed on both sides of the end plate, wherein the feed is disposed on the end plate of the first member, and a slot is formed on at least one of the side wall plates of the first member, and second members composed of non-metallic materials and bonded to the first member to shield the slot;

a housing including an upper housing and a lower housing; wherein the lower housing includes a bottom plate; the upper housing includes a panel provided with a metal area; and the first member of the antenna is connected with the bottom plate; wherein the feed includes a first feed element and a second feed element which are disposed on the end plate of the first member; wherein a spacer is disposed between the first feed element and the second feed element; wherein the spacer of the antenna includes a first elastic plate, a second elastic plate and a third elastic plate which are sequentially connected; preset angles are formed respectively between the first elastic plate which are sequentially connected; preset angles are formed respectively between the first elastic plate and the second elastic plate is connected with the end plate of the antenna; the second elastic plate is connected with the metal area of panel; and the third elastic plate is connected with a card holder of the mobile terminal.

* * * * *